United States Patent
Goossens (10) Patent No.: US 12,061,776 B2
(45) Date of Patent: Aug. 13, 2024

(54) LIST NAVIGATION WITH EYE TRACKING

(71) Applicant: Google LLC, Mountain View, CA (US)

(72) Inventor: Erik Hubert Dolly Goossens, San Francisco, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 18/340,612

(22) Filed: Jun. 23, 2023

(65) Prior Publication Data
US 2023/0418438 A1    Dec. 28, 2023

Related U.S. Application Data

(60) Provisional application No. 63/366,960, filed on Jun. 24, 2022.

(51) Int. Cl.
| | | |
|---|---|---|
| *G06F 3/0482* | (2013.01) | |
| *G06F 3/01* | (2006.01) | |
| *G06F 3/04842* | (2022.01) | |
| *G06F 3/0485* | (2022.01) | |
| *G06F 3/04886* | (2022.01) | |

(52) U.S. Cl.
CPC ............ *G06F 3/0482* (2013.01); *G06F 3/013* (2013.01); *G06F 3/04842* (2013.01); *G06F 3/0485* (2013.01); *G06F 3/04886* (2013.01)

(58) Field of Classification Search
CPC .... G06F 3/013; G06F 3/0482; G06F 3/04842; G06F 3/0485; G06F 3/04886
USPC ........................................................ 345/156
See application file for complete search history.

(56) References Cited

U.S. PATENT DOCUMENTS

| | | | |
|---|---|---|---|
| 2012/0105486 A1* | 5/2012 | Lankford | ................ G06F 3/005 348/78 |
| 2014/0002377 A1* | 1/2014 | Brauninger | ......... G06F 3/04886 345/173 |
| 2014/0098102 A1* | 4/2014 | Raffle | ................... G06F 40/103 345/440 |
| 2015/0199087 A1* | 7/2015 | Kritt | ................... G06F 3/04886 715/787 |
| 2016/0132203 A1* | 5/2016 | Seto | .................... G06F 3/04886 715/830 |

(Continued)

OTHER PUBLICATIONS

Bagling, "Navigating to Real Life Objects in Indoor Environments Using an Augmented Reality Headset", Master's Thesis in Computing Science, 30 HP, UMEA University Department of Computing Science, May 22, 2017, 78 pages.

(Continued)

*Primary Examiner* — Tom V Sheng
(74) *Attorney, Agent, or Firm* — Brake Hughes Bellermann LLP (57) ABSTRACT

Described techniques enable displaying a plurality of positions arranged around a central location on a display, the plurality of positions including at least one empty position and filled positions displaying a first subset of list elements, the filled positions including an adjacent position that is adjacent to the at least one empty position. Movement of a gaze point may be tracked, relative to the filled positions and around the central location towards the at least one empty position. The at least one empty position may be filled with a list element of the list elements, and the adjacent position may be emptied to thereby display a second subset of the list elements.

20 Claims, 7 Drawing Sheets (56) References Cited

U.S. PATENT DOCUMENTS

| | | | | |
|---|---|---|---|---|
| 2016/0320923 | A1* | 11/2016 | Hossain | G06F 3/04886 |
| 2017/0212583 | A1* | 7/2017 | Krasadakis | G06F 3/0482 |
| 2019/0324534 | A1* | 10/2019 | George-Svahn | G06F 3/013 |
| 2021/0318790 | A1* | 10/2021 | Palos | G06F 3/04815 |
| 2022/0350997 | A1* | 11/2022 | Wu | G02B 27/0093 |
| 2022/0413607 | A1* | 12/2022 | Liu | G06F 3/011 |

OTHER PUBLICATIONS

Feng, et al., "Wayfinding Behaviour in a Multi-Level Building: A Comparative Study of HMD VR and Desktop VR", ScienceDirect, Advanced Engineering Informatics, vol. 51, Jan. 2022, 65 pages.

Griffin, et al., "Out-Of-Body Locomotion: Vectionless Navigation With a Continuous Avatar Representation", University of Nevada, Reno; A Thesis Submitted in Partial Fulfillment of the Requirements for the Degree of Master of Science in Computer Science and Engineering, Aug. 2020, 35 pages.

* cited by examiner

LIST NAVIGATION WITH EYE TRACKING

CROSS-REFERENCE TO RELATED APPLICATION

This application claims priority to U.S. Provisional Patent Application No. 63/366,960, filed on Jun. 24, 2022, entitled "LIST NAVIGATION WITH EYE TRACKING", the disclosure of which is incorporated by reference herein in its entirety.

TECHNICAL FIELD

This description relates to use of eye tracking to navigate lists of elements.

BACKGROUND

Various type of devices and related displays are used to display lists of elements, such as lists of words or numbers, or lists of images or icons. Many techniques exist for scrolling through such lists to obtain a desired element. For example, scroll bars may be integrated into graphical user interfaces (GUIs), and/or hardware solutions (e.g., a scroll wheel on a mouse) may be used.

In many cases, however, conventional scrolling techniques are not suitable or not available. For example, for small field-of-view displays and/or for devices without typical input devices such as a mouse or touchpad, conventional techniques for scrolling through a list of elements longer than can be shown on the display at a given time are inconvenient, unavailable, or error-prone.

More particularly, for example, small field-of-view displays used in smart glasses or other head mounted devices (HMDs) may use eye-tracking to perform various navigation functions. When used to navigate (e.g., scroll through) lists of elements, however, such techniques may have various associated difficulties. For example, such techniques may be prone to overshoot (e.g., inadvertently moving past a desired list element of a list being scrolled). In other examples, such techniques may require inconvenient or non-intuitive eye movements.

SUMMARY

In a general aspect, described techniques enable displaying a plurality of positions arranged around a central location on a display, the plurality of positions including at least one empty position and filled positions displaying a first subset of list elements, the filled positions including an adjacent position that is adjacent to the at least one empty position. Movement of a gaze point may be tracked, relative to the filled positions and around the central location towards the at least one empty position. The at least one empty position may be filled with a list element of the list elements, and the adjacent position may be emptied to thereby display a second subset of the list elements.

In some aspects, the techniques described herein relate to a device including a display, a sensor configured to perform eye-tracking to determine a gaze point on the display, and list display control circuitry configured to display a plurality of positions arranged around a central location on the display. The plurality of positions include at least one empty position and filled positions displaying a first subset of list elements, where the filled positions include an adjacent position that is adjacent to the at least one empty position. The device includes list navigation control circuitry configured to track movement of the gaze point relative to the filled positions and around the central location towards the at least one empty position, fill the at least one empty position with a list element of the list elements, and empty the adjacent position to thereby display a second subset of the list elements.

The details of one or more implementations are set forth in the accompanying drawings and the description below. Other features will be apparent from the description and drawings, and from the claims.

DETAILED DESCRIPTION

Described systems and techniques enable rapid, accurate list navigation using eye tracking techniques. Accordingly, list navigation may be performed, even on a small field-of-view display, in an intuitive, reliable manner. List navigation may be performed without the use of other input devices such as a mouse, trackpad, etc.

As referenced above, eye tracking techniques may be used to facilitate list navigation and other device interactions, particularly for smart glasses and other HMDs, where a display may already be mounted close to a user's eyes. Even with best-available eye tracking techniques, however, navigating through lists of elements that are longer than can be feasibly displayed on a small field-of-view display may be difficult and problematic when using conventional techniques.

In described techniques, however, a list of 'n' elements may be navigated by displaying a plurality of positions around a central location, and displaying a subset of the elements, with each subset element displayed in a corresponding position of the plurality of positions. The number of elements in the subset of elements may be at least one fewer than the number of positions in the plurality of positions, so that at least one of the plurality of positions is left empty.

In a more specific example, as described in more detail, below, a matrix or array of four positions (e.g., quadrants) may be defined using two crossed lines, so that a central point is defined at an intersection of the two crossed lines. Then, of a list of n elements, a subset of three elements may be displayed within the four positions, leaving one of the four positions empty.

In described techniques, a gaze point of a user looking through the quadrants at the displayed elements, e.g., moving from one element to the next in a spiral manner around the central location (e.g., central point), may be tracked using eye tracking techniques. As the gaze point moves in such a spiral manner and approaches the empty position, the empty position may be filled with a subsequent element of the list of elements. An adjacent position (i.e., adjacent to the empty position) may also be emptied, to establish a new empty position.

In this way, in the example, three of the four positions are continuously filled, while one of the four positions is continuously empty. By repeatedly filling an empty position with a subsequent list element while emptying an adjacent position of a displayed list element, described techniques enable navigation through the list of elements.

Moreover, list navigation may easily be enabled in either direction (e.g., forward or backward) through the element list. For example, navigation in a forward direction through a list (e.g., increasing numerical order) may be implemented by movement of a gaze point in a clockwise direction around the central location, while navigation in a backward direction through a list (e.g., decreasing numerical order) may be implemented by movement of a gaze point in a counter-clockwise direction around the central location.

Accordingly, users of small field-of-view and other displays may easily navigate through even long lists of elements, in an intuitive, accurate, and reliable manner. In specific examples, described techniques facilitate adoption of smart glasses and other HMDs, e.g., by enabling such list navigation techniques.

Figure 1:
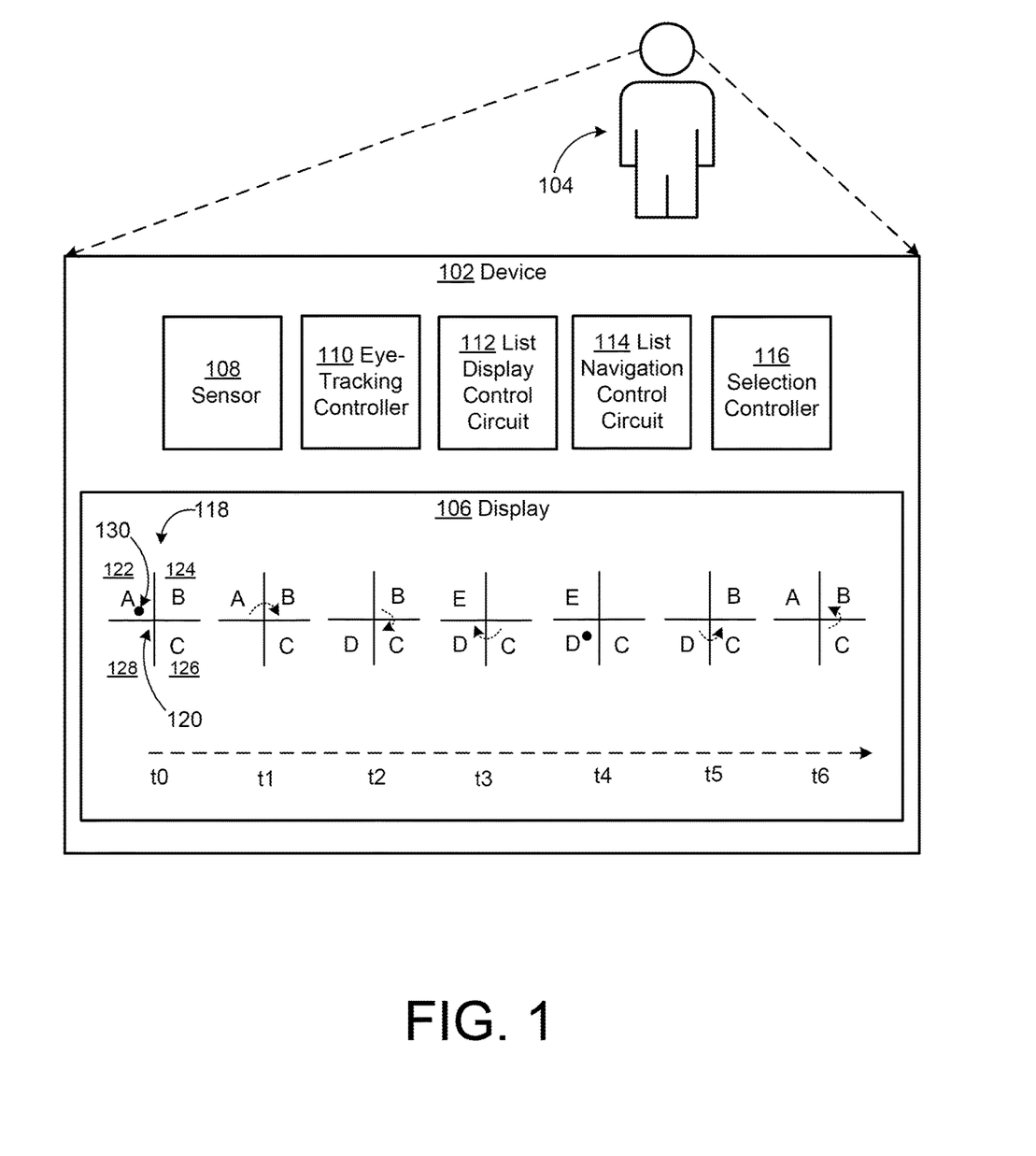
FIG. 1 is a block diagram of a device for list navigation with eye tracking.

FIG. 1 is a block diagram of a device for list navigation with eye tracking. In the example of FIG. 1, a device 102 is illustrated as being used by an operator 104. As described in detail, below, the device 102 may be configured to provide the types of list navigation with eye tracking referenced above.

The device 102 may include any suitable device that may benefit from the techniques described herein. For example, the device 102 may represent glasses, such as smart glasses, augmented reality (AR) glasses, or virtual reality (VR) glasses. More generally, the device 102 may represent any head-mounted device (HMD), including, e.g., a hat, helmet, or headband, including, e.g., an AR or VR headset. Even more generally, the device 102 may represent any wearable or holdable device that may be configured to display a list of elements.

Accordingly, the device 102 is illustrated as including a display 106. As referenced above, and described below in detail with respect to FIG. 7, the display 106 may include a lens when the device 102 is implemented as a pair of smart glasses. In other examples, the display 106 may represent any visual, interactive display suitable for implementing eye tracking.

Such eye tracking may be implemented using a sensor 108 and a corresponding eye-tracking controller 110. For example, the sensor 108 may represent a camera with a view of the display 106, and the eye-tracking controller 110 may represent hardware (e.g., processor and memory) and associated software (e.g., instructions stored using the memory and executed using the processor) used to receive a sensor signal from the sensor 108 and detect or infer eye movements of the operator 104 therefrom. Any suitable implementation of the eye-tracking controller 110 may be used, and various example eye tracking techniques are not described herein in detail, except as may be necessary or helpful in understanding described techniques.

A list display control circuit 112 may be configured to display a plurality of positions, e.g., as a matrix or array of positions arranged around a central location or point. As in the examples above, and in similar but more detailed examples provided below with respect to FIG. 1, such an array (e.g., an array 118) may be provided as an array of four quadrants.

Figure 3:
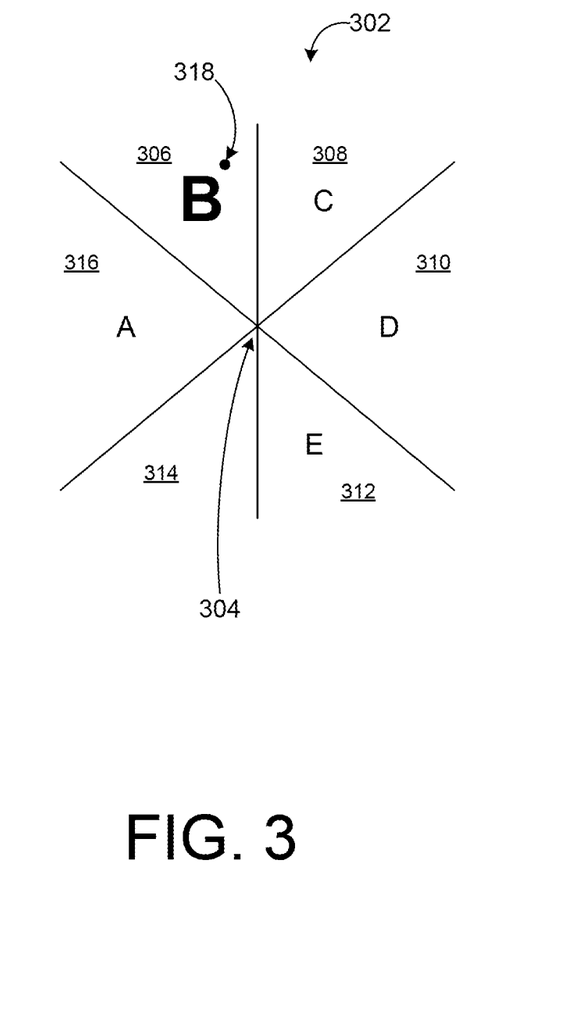
FIG. 3 illustrates an alternative example display that may be used in the device of FIG. 1.

In other examples, however, including the example of FIG. 3, the list display control circuit 112 may display an array with any suitable number of positions, e.g., 3, 5, 6 or more positions. Moreover, the operator 104 may be provided with an ability to customize operations of the list display control circuit 112, e.g., to select between available types or configuration of arrays.

The list of elements to be displayed may be understood to include any list of 'n' elements of any suitable type. In various implementations, the list of elements to be displayed may be stored locally to the device 102, or may be accessed remotely using an available network connection.

For example, the list of elements may include a list of contacts known to the operator 104. The list may be stored and displayed in a pre-defined order, e.g., alphabetical or numerical order. In other examples, the list of elements may be displayed in an order determined by (e.g., customizable by) the operator 104.

In other examples, the list of elements may be dynamic, and may be changed by the list display control circuit 112 in an intelligent manner, e.g., based on current circumstances or anticipated use cases. For example, the list display control circuit 112 may implement a trained neural network or other artificial intelligence (AI)/machine learning (ML) technique (s) designed to populate a list of elements with elements determined to be potentially useful to the operator 104 at a given point in time and/or in a given circumstance.

A list navigation control circuit 114 may be configured to interact with the eye-tracking controller 110 and the list display control circuit 112 to determine whether, when, and how to populate and de-populate array positions to enable the types of list navigation described herein. For example, as referenced above, the list navigation control circuit 114 may be configured to determine a spiral motion of a gaze point of the operator 104 around a central location of an array displayed by the list display control circuit 112, and to maintain at least one empty position within the array by populating a current empty position with a subsequent list element and de-populating an adjacent position to provide a new empty position.

A selection controller 116 may be configured to enable the operator 104 to select a desired element of the list of elements, once the desired element is reached using the list navigation control circuit 114 and related techniques. For example, the operator 104 may navigate through a list of contacts to select a particular contact as a recipient of an email, text, or phone call.

The term selection in this context should be understood broadly to refer to any type or degree of selection, and any ensuing or related actions. For example, in the preceding example, a contact may be selected for purposes of editing contact details/information, or may be selected to execute a desired action, such as an email/text/phone call. Various other types of selections and associated techniques are described below by way of example, or would be apparent.

For purposes of illustration and by way of non-limiting example, FIG. 1 illustrates a time-lapsed example of a particular implementation of the list display control circuit 112 and the list navigation control circuit 114. In the example, the list display control circuit 112 displays an array 118 that includes four quadrants defined by intersecting lines, as shown, to thereby define a central location (e.g., point of intersection) 120. Accordingly, the array 118 includes a position 122, a position 124, a position 126, and a position 128.

In the simplified example of FIG. 1, the list of elements is presumed to be letters of the alphabet, arranged in order. Consequently, as shown, the position 122 includes the letter A, the position 124 includes the letter B, and the position 126 includes the letter C. As also shown, the position 128 is left empty. Therefore, the position 122 and the position 126 may each be referred to as an adjacent position, i.e., adjacent to the empty position 128.

A gaze point 130 is explicitly illustrated in FIG. 1 for ease of illustration. In example implementations, the gaze point 130 may be tracked by the eye-tracking controller 110, without being made visible to the operator 104. In other example implementations, the gaze point 130 may be visually represented, e.g., to assist the operator 104 in using the eye-tracking techniques described herein. For example, the gaze point 130 may be provided as, or in conjunction with, a cursor that is implemented by the selection controller 116.

As referenced above, FIG. 1 illustrates a time-lapsed view across points in time shown as t0, t1, t2, t3, t4, t5, and t6. During this elapsed time, the array 118 stays positioned within a single portion of the display 106, and the gaze point 130 moves spirally in a direction(s) illustrated by dashed, curved arrows, and around the central location 120. At the times t1-t6, the various reference numerals 118-130 are not repeated, for clarity and ease of illustration.

At the time t0, the array 118 is displayed by the list display control circuit 112 and populated with the first three elements A, B, C of the list of elements (e.g., letters of the alphabet). The gaze point 130 is detected within the position 122. In this regard, it will be appreciated that the gaze point 130 may be detected anywhere within the position 122, including directly on the displayed element (letter A).

At the time t1, the gaze point 130 has moved from the position 122 to the position 124, as indicated by the curved, dashed arrow. At the time t2, upon initial detection of the gaze point 130 at the position 124, the empty position 128 of time t1 is populated with a subsequent element of the list of elements, e.g., the letter D. Additionally, the adjacent position 122 is de-populated to provide the position 122 as a new empty position. Meanwhile, in conjunction with the population of the empty position 128 and the de-population of the adjacent position 122 to provide a new empty position, the gaze point 130 continues moving in a spiral fashion to the position 126.

At time t3, the gaze point 130 has moved from the position 124 to the position 126, and is continuing to move in a spiral fashion towards the position 128. At the time t3, upon initial detection of the gaze point 130 at the position 126, the empty position 122 of time t2 is populated with a subsequent element of the list of elements, e.g., the letter E. Additionally, the adjacent position 124 is de-populated to provide the position 124 as a new empty position. Meanwhile, in conjunction with the population of the empty position 122 and the de-population of the adjacent position 124 to provide a new empty position, the gaze point 130 continues moving in a spiral fashion to the position 128.

At the time t4, the gaze point 130 is detected within the position 128. At a time t5, the gaze point 130 travels in a counter-clockwise direction, rotating towards the position 126. In other words, in the example, the operator 104 navigates from A to E, and then navigates in a reverse direction. Consequently, the list navigation control circuit 114 may de-populate the position 122 to form a new empty position, and populate the adjacent (and previously empty) position 124 with the letter B, as shown.

At the time t6, the counter-clockwise rotation of the gaze point 130 continues from the position 126 to the position 124. The list navigation control circuit 114 removes the letter D from the position1 128 to provide a new empty position, and populates the adjacent (and previously empty) position 122 with the letter A, as shown. In this way, the operator 104 may arrive back at a beginning of the list of elements, i.e., with the original subset (A, B, C) shown at time to.

Thus, the simplified example of FIG. 1 illustrates that when the operator 104 gazes at a current gaze position and included element, the gazed-upon element is visible, along with two adjacent elements in two adjacent positions, which may be in a peripheral view of the operator 104. Meanwhile, an opposite or farthest position is empty. For example, at time t1, as the gaze point 130 reaches the position 124, adjacent positions 122, 126 have elements displayed, while the position 128 is empty.

More generally, as the gaze point 130 spirals around the array 118, a transition trigger may be determined or detected, based on a position and/or movement of the gaze point 130 relative to, or with respect to, the empty position. In the above-referenced example of FIG. 1, the transition trigger detected by the list navigation control circuit 114 may be entry of the gaze point 130 into a position (e.g., the position 124 at time t1) that is opposite the current empty position (e.g., the position 128 at time t1), which triggers the transition that results in the display of the array 118 shown at time t2.

Additional or alternative transition triggers may be used, as well. For example, a transition trigger may be defined with respect to a speed of the movement of the gaze point 130, as well. For example, if the gaze point is moving faster (slower), then the transition trigger may be detected sooner (later) than in the example of FIG. 1.

Many graphical and/or visual effects may be used to facilitate use of the techniques described herein. For example, the array 118 may be visualized or conceptualized as a spiral staircase being viewed from above. In this approach, the gaze point 130 traversing a clockwise spiral is analogous to travelling down the spiral staircase. The empty position (e.g., the position 128 at time t0) may be understood to represent a closest out-of-view stair when travelling downwards, so that each act of stepping down brings the closest out-of-view stair (list element) into view, while moving out of view of a step closer to the top of the metaphorical staircase. Conversely, the gaze point 130 traversing a counter-clockwise spiral would be analogous to travelling up the spiral staircase in a similar fashion. Various visual effects (e.g., graphic renderings or animations) may be included to create a corresponding visualization to thereby make the list navigation more intuitive.

Figure 2:
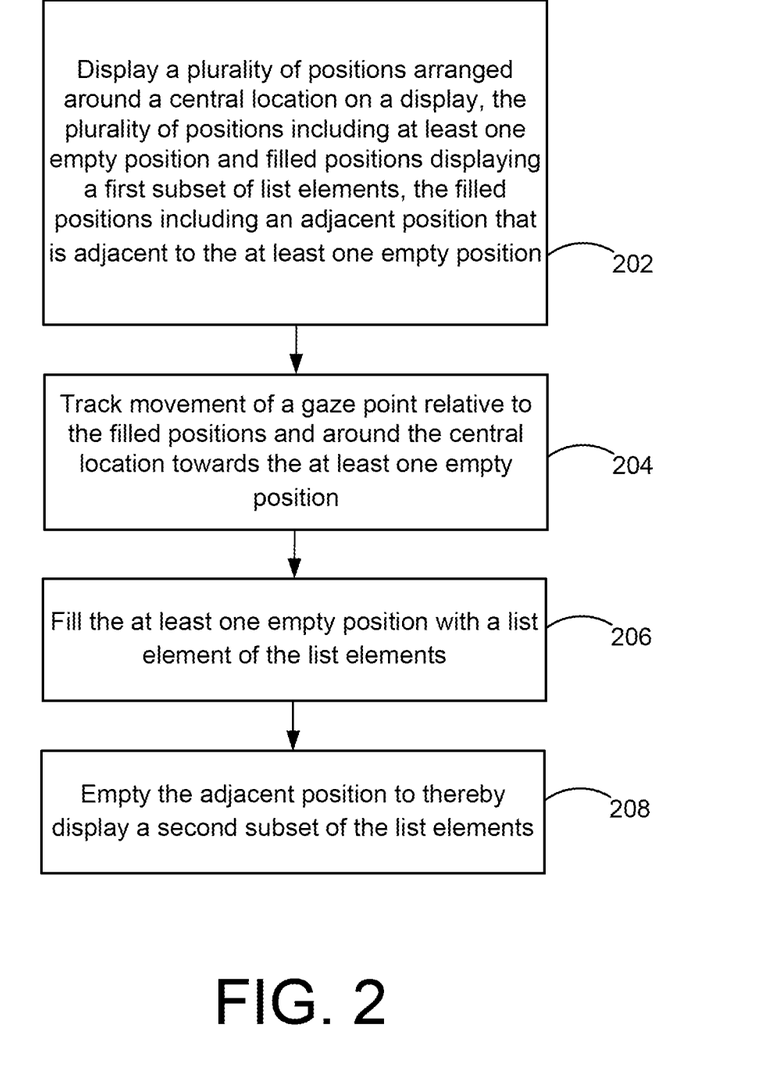
FIG. 2 is a flowchart illustrating example operations of the system of FIG. 1.

FIG. 2 is a flowchart illustrating example operations of the system of FIG. 1. In the example of FIG. 2, operations 202-208 are illustrated as separate, sequential operations. However, in various example implementations, the operations 202-208 may be implemented in a different order than illustrated, in an overlapping or parallel manner, and/or in a nested, iterative, looped, or branched fashion. Further, various operations or sub-operations may be included, omitted, or substituted.

In FIG. 2, a plurality of positions may be displayed on a display, the plurality of positions arranged around a central location, the plurality of positions including at least one empty position and filled positions displaying a first subset of list elements, the filled positions including an adjacent position that is adjacent to the at least one empty position (202). For example, the list display control circuit 112 of the device 102 of FIG. 1 may display the array 118. As described, the array 118 may be displayed as including the positions 122, 124, 126, 128 arranged around the central location 120, with the positions 122, 124, 126 being filled positions and the position 128 being an empty position. As also described herein, the array 118 may have any suitable number of dimensions, including any suitable number of filled positions and empty positions arranged in any desired manner.

Movement of a gaze point may be tracked relative to the filled positions and around the central location towards the at least one empty position (204). For example, the list navigation control circuit 114 may leverage the sensor 108 and the eye-tracking controller 110 to determine a location of the gaze point 130 on the display 106 and relative to the array 118. In this way, the gaze point 130 may be detected when it is within, and/or as it moves through, one or more of the filled positions 122, 124, 126.

The at least one empty position may be filled with a list element of the list elements (206). For example, when the list elements are stored as a list of consecutive or ordered list elements, and the first subset of list elements displayed in the array include a first ordered subset of the ordered list elements, the list navigation control circuit 114 may display a next-consecutive element following the final list element of the first ordered subset of list elements (e.g., as in FIG. 1, may fill the empty position 128 with the letter D when the first ordered subset includes the list elements A, B, C). In other examples, the list elements need not be a consecutive or ordered list of elements. In example implementations, the empty position 128 may be filled with a previously non-displayed list element.

The adjacent position may be emptied to thereby display a second subset of the list elements (208). For example, in FIG. 1, the list navigation control circuit 114 may be configured to empty the adjacent position 122 at the time t2, to thereby display the second subset of list elements illustrated as B, C, D. In example implementations, the empty position 128 may be filled at the same time (e.g., the time t2), or nearly the same time, that the filled, adjacent position 122 is emptied.

As may be appreciated from the description of FIG. 1, the processes of FIG. 2 may continue while the gaze point 130 continues to spiral around the central location 120, until, e.g., a final list element of the list elements is reached, a particular list element is selected, or the operator reverses a direction of the gaze point 130 (e.g., from clockwise to counter-clockwise). In this way, the operator 104 may easily use eye tracking techniques to navigate through a potentially lengthy list of elements, even when the display 106 is very small.

FIG. 3 illustrates an alternative example display that may be used in the device of FIG. 1. In the example of FIG. 3, a matrix or array 302 includes a central location 304 and positions 306, 308, 310, 312, 314, 316 that are arranged around the central location 304. Thus, FIG. 3 illustrates an alternate example of FIG. 1, in which the array 302 includes 6 positions rather than 4. As already referenced, many other array configurations may be used, as well.

Additionally, FIG. 3, similarly to FIG. 1, illustrates various array lines defining the positions 306-316, but such visible or explicit array lines are not required in all implementations. Similarly, although FIG. 3 illustrates the central location 304 as a point of intersection of lines of the array 302, the central location 304 may be defined using other techniques, as well, such as by defining a midpoint between displayed list elements. The central location 304 need not necessarily be at a mathematical center of a defined or undefined circle, however, and in some examples, may be central in the sense of being located within the subset of list elements being displayed and providing a reference point of rotation for a gaze point 318.

In the example of FIG. 3, the gaze point 318 illustrates that a gaze of an operator, such as the operator 104 of FIG. 1, is detected within the position 306. As noted, the gaze point 318 may be explicitly displayed, e.g., as a cursor. In other implementations, the gaze point 318 need not be displayed.

An included list element of the position 306, e.g., the letter B, may be visually highlighted to indicate current detection of the gaze point 318 within the filled position 306 (whether the gaze point 318 is displayed as a cursor or not). For example, such visual highlighting may serve to indicate and confirm that the gaze point 318 is currently detected within the filled position 306, and that the included list element (the letter B) is currently selectable, e.g., by the selection controller 116 of FIG. 1.

In this context, the term selection may refer to any indication or choice of the operator 104 to make further inspection or use of the list element in question. For example, when the list elements include contacts of the operator 104, a selection of a contact may enable inspection of the contact information (e.g., email address or phone number), or may include a click event that initiates a pre-defined action (e.g., sending an email, or making a phone call).

The operator 104 may select a selectable list element using any appropriate technique. For example, in the context of eye tracking, a selection may be made using pre-defined blinking techniques, and/or based on an extended gaze (beyond a defined gaze threshold time) of the operator 104 on a particular element to be selected. In other examples, gesture detection techniques may be used, such as when the device 102 represents smart glasses, and the operator 104 is also wearing a smart watch or other device capable of implementing gesture detection.

In addition to highlighting the list element "B" within the filled position 306, the list display control circuit 112 may use other or alternative techniques to optimize display and use of the array 302. For example, although not explicitly illustrated in FIG. 3, one or more other list elements (e.g., C, D, E, or A) may be visually de-emphasized relative to the highlighted, current list element B.

For example, the current list element B may be made brighter, larger, bolder, focused, or otherwise emphasized, so that the remaining list elements of the currently-displayed subset of list elements (C, D, E, and A) may be made dimmer, smaller, fainter, or unfocused (e.g., blurred). In other examples, the current list element B may be rendered in a particular color, while the remaining list elements of the currently-displayed subset of list elements (C, D, E, and A) may be made a different color.

As the gaze point 318 is detected to be moving (e.g., spiraling) around the central location 304 in a clockwise direction, a transition trigger may be detected. For example, the transition trigger may be defined as a combination of detecting the gaze point within the filled portion 308 (opposite the empty position 314) and detecting movement of the gaze point 318 in a clockwise direction. In other examples, the transition trigger may include other parameters, such as a minimum speed of movement through the filled position 308 and/or an estimated time before the gaze point 318 reaches the empty position 314.

As may be understood from the description of FIG. 1, detection of the transition trigger may cause the list navigation control circuit 114 to fill the empty position 314 with a next consecutive list element of the list elements (e.g. with the letter F), while also emptying the filled adjacent position in a direction of the gaze point travel (e.g., the adjacent position 316). In this way, the operator 104 may navigate through the list elements (e.g., letters of the alphabet) until a final element (e.g., the letter Z) is reached).

Figure 4:
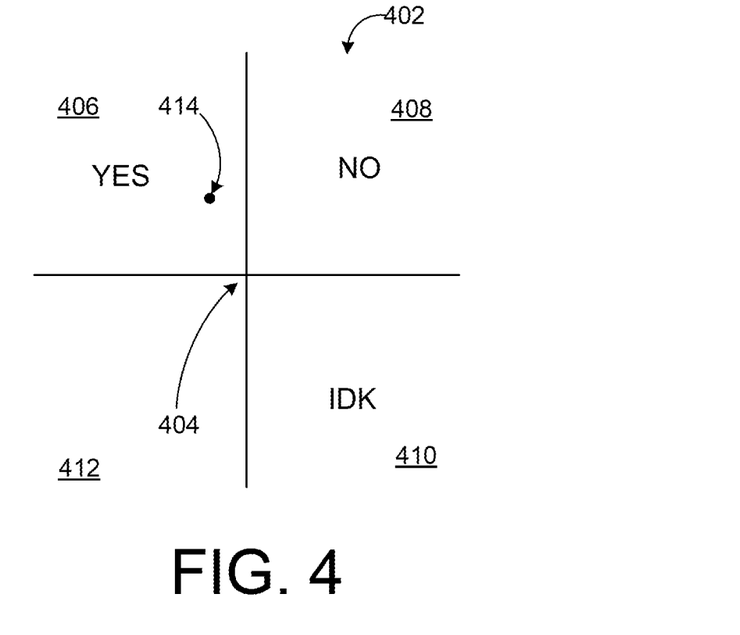
FIG. 4 illustrates a first view of a third example display that may be used in the device of FIG. 1.
Figure 5:
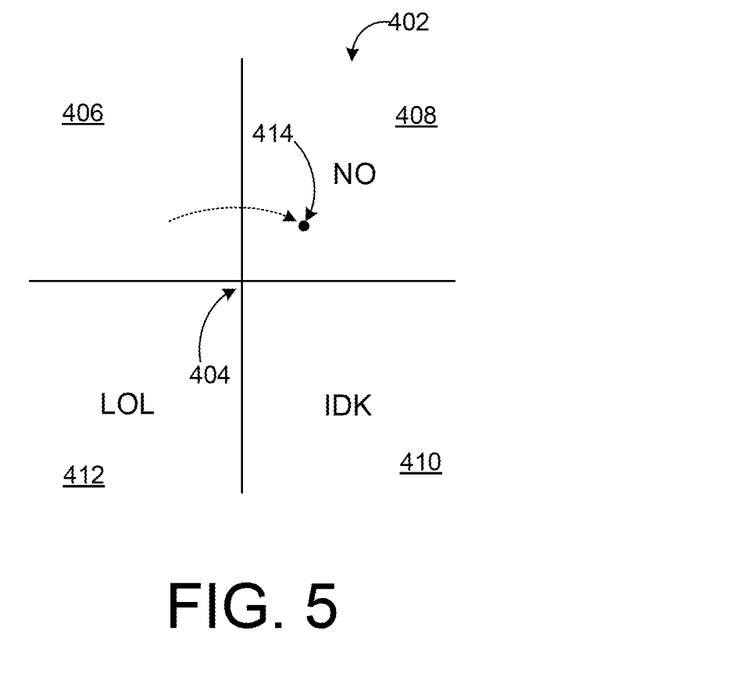
FIG. 5 illustrates a second view of the third example display of FIG. 4.

FIG. 4 illustrates a first view of a third example display, at a first time. FIG. 5 illustrates a second view of the third example display of FIG. 4, at a second time. In the example of FIG. 4, an array 402 is similar to the array 118 of FIG. 1, and includes a central location 404 with positions 406, 408, 410, 412.

As shown, the positions 406, 408, 410 are filled with list elements to define a first subset of list elements, while the position 412 is empty. FIG. 4 illustrates that the list elements may be any desired content, shown in FIG. 4 as "YES," "NO," and "IDK."

A gaze point 414 is detected in the position 406. As shown in FIG. 5 the gaze point 414 is illustrated as moving from the position 406 to the position 408. Assuming this movement is determined to be a transition trigger, then, the empty position 412 is filled with a subsequent list element (shown as the list element "LOL"), while the previously-filled adjacent position 406 is emptied, to thereby define and display a second subset of list elements.

Figure 6:
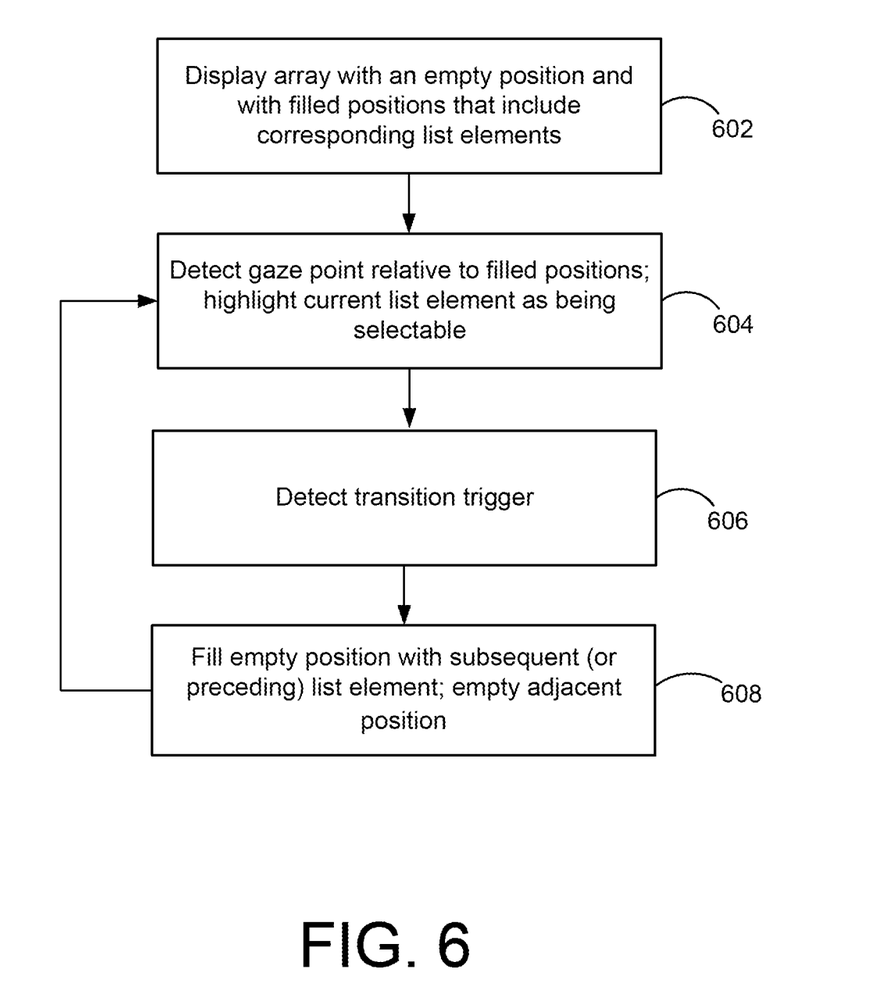
FIG. 6 illustrates a process flow according to the example embodiments of FIGS. 1-5.

FIG. 6 illustrates a process flow according to the example embodiments of FIGS. 1-5. In the example of FIG. 6, in order to provide navigation of list elements with eye-tracking, an array may be displayed that includes an empty position and filled positions that include corresponding list elements (602).

A current gaze point may be detected relative to the filled positions (604). Such detection may include detecting whether the gaze point is stationary or moving, and determining a rate and direction of any such movement. The gaze point detection may also include visually highlighting a current list element as being specified by the gaze point as being selectable.

A transition trigger may be detected (606). For example, a position of the gaze point relative to (e.g., a distance of the gaze point from) the empty position may be used as a transition trigger. Additionally, or alternatively, a direction and/or movement (including rate of movement) of the gaze point relative to the empty position may be used as a transition trigger.

In response to the transition trigger being detected, the empty position may be filled with a subsequent or preceding list element, and the corresponding adjacent position in a direction of the movement of the gaze point may be emptied (608). For example, as in the preceding examples, when the gaze point is moving in a clockwise direction the empty position may be filled with a subsequent list element and the adjacent filled position in a clockwise direction may be emptied. Conversely, when the gaze point is moving in a counterclockwise direction the empty position may be filled with a subsequent list element and the adjacent filled position in a counterclockwise direction may be emptied.

As described above, and as further illustrated in FIG. 6, the operations 604, 606, 608 may continue to enable the operator 104 to navigate forward and backwards through an entirety of a set of list elements, displaying different subsets of the list elements while also defining the empty position(s) at different ones of the positions of the array, as the list elements are navigated. Although not explicitly illustrated in FIG. 6, the operator 104 may select a current list element at any point during such list navigations.

Many different example implementations and features may be included. For example, when using described techniques for navigating through list elements, a separate display or display portion may be used to visually display larger subsets of the list, or the entire list. Then, particularly for relatively long lists, an operator may be provided with an ability to gauge a position of a current subset of list elements within the overall list.

In other examples, changes in gaze point direction (e.g., from clockwise to counterclockwise, or vice versa) may be used to provide interaction options. For example, when an operator proceeds through a list of numbers 1-10 by gazing clockwise to the number 7, then counterclockwise back to the number 3, and then clockwise back to the number 9, then the changes of direction and/or pauses (e.g., longer than a defined threshold time) at each number may be used as selection options for those numbers, so that, in the example, the numbers 379 are selected. In this way, described techniques may be used to implement a version of a combination lock, and may be used to enter a PIN or other access code.

Figure 7:
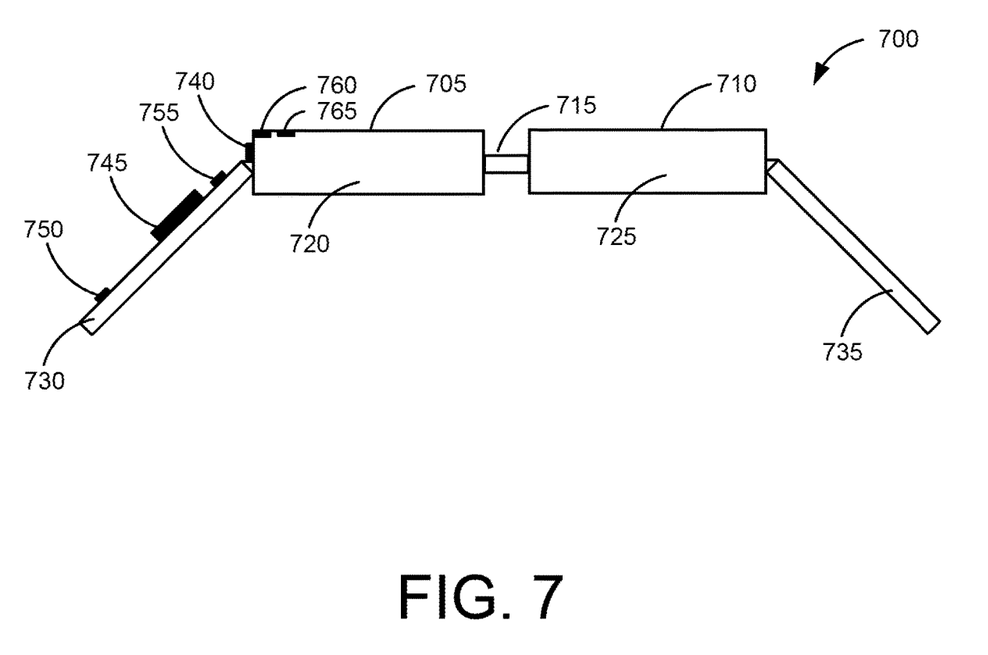
FIG. 7 illustrates an example pair of wearable glasses that may be used to implement the device of FIG. 1.

FIG. 7 illustrates an example pair of wearable glasses that may be used to implement the device of FIG. 1. Wearable glasses 700 may include lens frame 705, lens frame 710, center frame support 715, lens element 720, lens element 725, extending side-arm 730, extending side-arm 735, image capture device 740 (e.g., a camera), on-board computing system 745 (which may include, or utilize, a touch input feature, such as a touchpad), speaker 750, and microphone 755.

Each of the frame elements 705, 710, and 715 and the extending side-arms 730, 735 can be formed of a solid structure of plastic and/or metal, or can be formed of a hollow structure of similar material so as to allow wiring and component interconnects to be internally routed through the wearable glasses 700. Other materials can be possible as well. At least one of the lens elements 720, 725 can be formed of any material that can suitably display a projected image or graphic. Each of the lens elements 720, 725 can also be sufficiently transparent to allow a user to see through the lens element. Combining these two features of the lens elements can facilitate an augmented reality or heads-up display where the projected image or graphic is superimposed over a real-world view as perceived by the user through the lens elements.

The center frame support 715 and the extending side-arms 730, 735 are configured to secure the wearable glasses 700 to a user's face via a user's nose and ears, respectively. The extending side-arms 730, 735 can each be projections that extend away from the lens-frames 705, 710, respectively, and can be positioned behind a user's ears to secure the wearable glasses 700 to the user. The extending side-arms 730, 735 can further secure the wearable glasses 700 to the user by extending around a rear portion of the user's head. Additionally, or alternatively, for example, the wearable glasses 700 can connect to or be affixed within a head-mounted helmet structure. Other configurations for wearable glasses are also possible.

The on-board computing system 745 is shown to be positioned on the extending side-arm 730 of the wearable glasses 700; however, the on-board computing system 745 can be provided on other parts of the wearable glasses 700 or can be remotely positioned from the wearable glasses 700 (e.g., the on-board computing system 745 could be wire- or wirelessly-connected to the wearable glasses 700). The on-board computing system 745 can include a processor and memory, for example. The on-board computing system 745 can be configured to receive and analyze data from the image capture device 740 (and possibly from other sensory devices) and generate images for output by the lens elements 720, 725.

The image capture device 740 can be, for example, a camera that is configured to capture still images and/or to capture video. In the illustrated configuration, image capture device 740 is positioned on the extending side-arm 730 of the wearable glasses 700; however, the image capture device 740 can be provided on other parts of the wearable glasses 700. The image capture device 740 can be configured to capture images at various resolutions or at different frame rates. Many image capture devices with a small form-factor, such as the cameras used in mobile phones or webcams, for example, can be incorporated into an example of the wearable glasses 700.

One image capture device 740 is illustrated. However, more image capture devices can be used, and each can be configured to capture the same view, or to capture different views. For example, the image capture device 740 can be forward facing to capture at least a portion of the real-world view perceived by the user. This forward-facing image captured by the image capture device 740 can then be used to generate an augmented reality where computer generated images appear to interact with or overlay the real-world view perceived by the user.

Wearable glasses 700 can be used to (e.g., the on-board computing system 745) interpret certain gestures (e.g., by a wearer's hand or hands) as user input. For example, wearable glasses 700 can capture hand gestures by analyzing image data from image capture device 740, and initiate tasks that are defined as corresponding to certain gestures. Further, speaker 750 and microphone 755 can be used as input/output components. For example, the microphone 755 can detect speech that can be used to supplement and/or modify the intent associated with the hand gesture. The speaker can be configured to output an audible signal that can be heard by the user. The audible signal can be associated with the task associated with the task(s) that are responsive to the hand gesture. For example, the audible signal can be a beep indicating a task has been completed.

In some implementations, the wearable glasses 700 can determine a user's intent, such as an intent to capture an image or video using the image capture device 740, as described herein. In some implementations, it should be noted that the wearable glasses 700 may determine user's intent based on a combination of hand gestures and verbal commands from a digital assistant.

In FIG. 7, a sensor 760 may represent the sensor 108 of FIG. 1. In other implementations, the image capture device 740 may be used as the sensor 108. A light source 765 may be used to enhance an accuracy of eye-tracking operation(s) of the sensor 760.

Further in FIG. 7, it will be appreciated that the on-board computing system 745 may be used to provide, e.g., the list display control circuit 112 and the list navigation control circuit 114 of FIG. 1. The lens element 720 (and/or the lens element 725) may be used as the display 106 of FIG. 1. Accordingly, the wearable glasses 700 may be configured to implement the list display and navigation techniques described herein, so that the wearable glasses 700 may be used to provide fast, accurate, reliable list navigation, notwithstanding the small field of view of the lens elements 720, 725.

Figure 8:
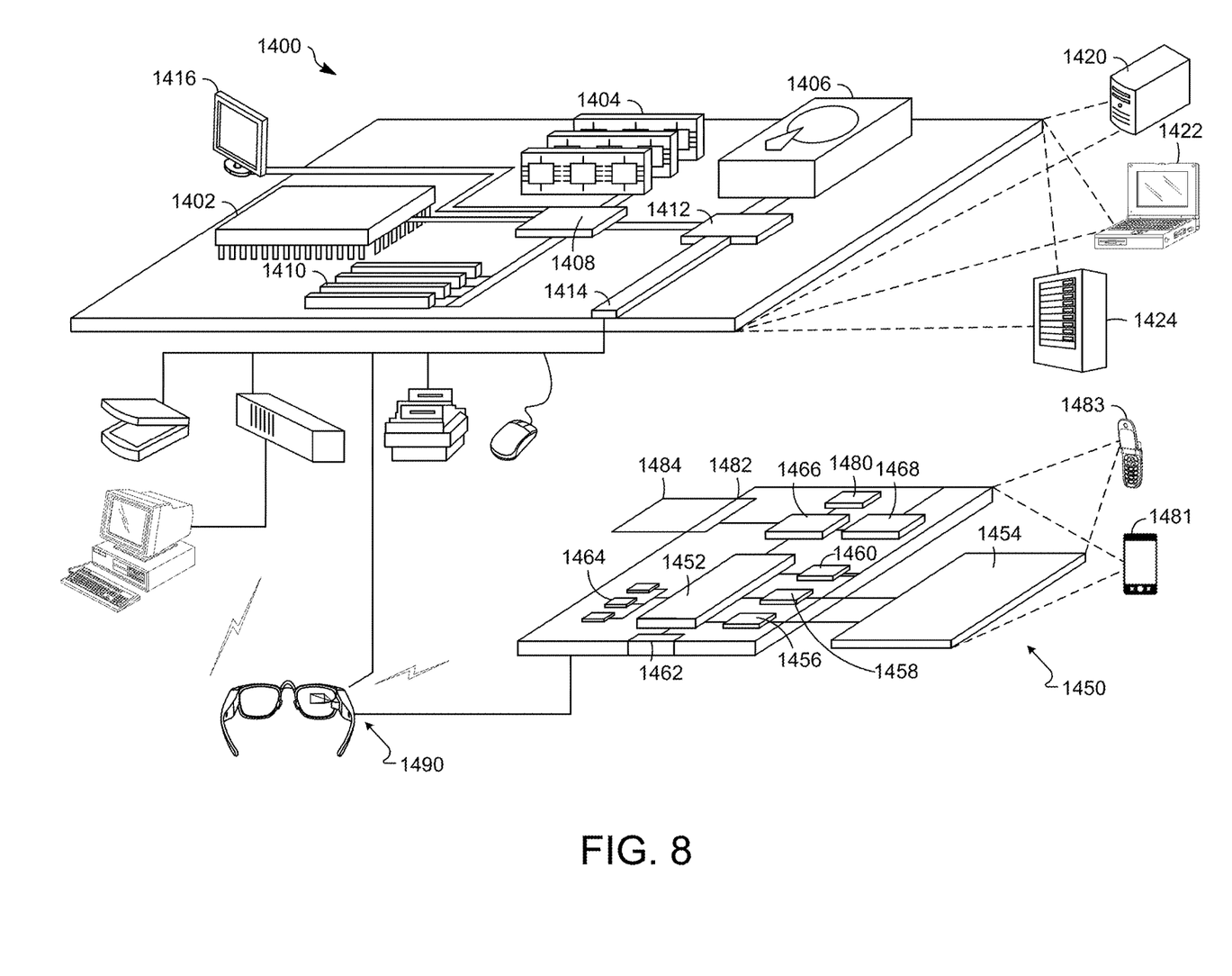
FIG. 8 shows an example of a computer device, mobile computer device and head mounted device according to at least one example implementation.

FIG. 8 shows an example of a computer device, mobile computer device and head mounted device according to at least one example implementation. In FIG. 8, computing device 1400 is intended to represent various forms of digital computers, such as laptops, desktops, tablets, workstations, personal digital assistants, smart devices, appliances, electronic sensor-based devices, televisions, servers, blade servers, mainframes, and other appropriate computing devices. Computing device 1450 is intended to represent various forms of mobile devices, such as personal digital assistants, cellular telephones, smart phones, and other similar computing devices. The components shown here, their connections and relationships, and their functions, are meant to be exemplary only, and are not meant to limit implementations described and/or claimed in this document.

Computing device 1400 includes a processor 1402, memory 1404, a storage device 1406, a high-speed interface 1408 connecting to memory 1404 and high-speed expansion ports 1410, and a low speed interface 1412 connecting to low speed bus 1414 and storage device 1406. The processor 1402 can be a semiconductor-based processor. The memory 1404 can be a semiconductor-based memory. Each of the components 1402, 1404, 1406, 1408, 1410, and 1412, are interconnected using various busses, and may be mounted on a common motherboard or in other manners as appropriate. The processor 1402 can process instructions for execution within the computing device 1400, including instructions stored in the memory 1404 or on the storage device 1406 to display graphical information for a GUI on an external input/output device, such as display 1416 coupled to high speed interface 1408. In other implementations, multiple processors and/or multiple buses may be used, as appropriate, along with multiple memories and types of memory. Also, multiple computing devices 1400 may be connected, with each device providing portions of the necessary operations (e.g., as a server bank, a group of blade servers, or a multi-processor system).

The memory 1404 stores information within the computing device 1400. In one implementation, the memory 1404 is a volatile memory unit or units. In another implementation, the memory 1404 is a non-volatile memory unit or units. The memory 1404 may also be another form of computer-readable medium, such as a magnetic or optical disk. In general, the computer-readable medium may be a non-transitory computer-readable medium.

The storage device 1406 is capable of providing mass storage for the computing device 1400. In one implementation, the storage device 1406 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods and/or computer-implemented methods, such as those described above. The information carrier is a computer- or machine-readable medium, such as the memory 1404, the storage device 1406, or memory on processor 1402.

The high speed controller 1408 manages bandwidth-intensive operations for the computing device 1400, while the low speed controller 1412 manages lower bandwidth-intensive operations. Such allocation of functions is exemplary only. In one implementation, the high-speed controller 1408 is coupled to memory 1404, display 1416 (e.g., through a graphics processor or accelerator), and to high-speed expansion ports 1410, which may accept various expansion cards (not shown). In the implementation, low-speed controller 1412 is coupled to storage device 1406 and low-speed expansion port 1414. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 1400 may be implemented in a number of different forms, as shown in the figure. For example, it may be implemented as a standard server 1420, or multiple times in a group of such servers. It may also be implemented as part of a rack server system 1424. In addition, it may be implemented in a computer such as a laptop computer 1422. Alternatively, components from computing device 1400 may be combined with other components in a mobile device (not shown), such as device 1450. Each of such devices may contain one or more of computing device 1400, 1450, and an entire system may be made up of multiple computing devices 1400, 1450 communicating with each other.

Computing device 1450 includes a processor 1452, memory 1464, an input/output device such as a display 1454, a communication interface 1466, and a transceiver 1468, among other components. The device 1450 may also be provided with a storage device, such as a microdrive or other device, to provide additional storage. Each of the components 1450, 1452, 1464, 1454, 1466, and 1468, are interconnected using various buses, and several of the components may be mounted on a common motherboard or in other manners as appropriate.

The processor 1452 can execute instructions within the computing device 1450, including instructions stored in the memory 1464. The processor may be implemented as a chipset of chips that include separate and multiple analog and digital processors. The processor may provide, for example, for coordination of the other components of the device 1450, such as control of user interfaces, applications run by device 1450, and wireless communication by device 1450.

Processor 1452 may communicate with a user through control interface 1458 and display interface 1456 coupled to a display 1454. The display 1454 may be, for example, a TFT LCD (Thin-Film-Transistor Liquid Crystal Display) or an OLED (Organic Light Emitting Diode) display, or other appropriate display technology. The display interface 1456 may comprise appropriate circuitry for driving the display 1454 to present graphical and other information to a user. The control interface 1458 may receive commands from a user and convert them for submission to the processor 1452. In addition, an external interface 1462 may be provided in communication with processor 1452, so as to enable near area communication of device 1450 with other devices. External interface 1462 may provide, for example, for wired communication in some implementations, or for wireless communication in other implementations, and multiple interfaces may also be used.

The memory 1464 stores information within the computing device 1450. The memory 1464 can be implemented as one or more of a computer-readable medium or media, a volatile memory unit or units, or a non-volatile memory unit or units. Expansion memory 1484 may also be provided and connected to device 1450 through expansion interface 1482, which may include, for example, a SIMM (Single In Line Memory Module) card interface. Such expansion memory 1484 may provide extra storage space for device 1450, or may also store applications or other information for device 1450. Specifically, expansion memory 1484 may include instructions to carry out or supplement the processes described above, and may include secure information also. Thus, for example, expansion memory 1484 may be provided as a security module for device 1450, and may be programmed with instructions that permit secure use of device 1450. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 1464, expansion memory 1484, or memory on processor 1452, that may be received, for example, over transceiver 1468 or external interface 1462.

Device 1450 may communicate wirelessly through communication interface 1466, which may include digital signal processing circuitry where necessary. Communication interface 1466 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 1468. In addition, short-range communication may occur, such as using a Bluetooth, low power Bluetooth, Wi-Fi, or other such transceiver (not shown). In addition, GPS (Global Positioning System) receiver module 1480 may provide additional navigation- and location-related wireless data to device 1450, which may be used as appropriate by applications running on device 1450.

Device 1450 may also communicate audibly using audio codec 1460, which may receive spoken information from a user and convert it to usable digital information. Audio codec 1460 may likewise generate audible sound for a user, such as through a speaker, e.g., in a handset of device 1450. Such sound may include sound from voice telephone calls, may include recorded sound (e.g., voice messages, music files, etc.) and may also include sound generated by applications operating on device 1450.

The computing device 1450 may be implemented in a number of different forms, as shown in the figure. For example, it may be implemented as a cellular telephone 1483. It may also be implemented as part of a smart phone 1481, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as modules, programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor, or LED (light emitting diode)) for displaying information to the user and a keyboard and a pointing device (e.g., a mouse or a trackball) by which the user can provide input to the computer. Other kinds of devices can be used to provide for interaction with a user as well. For example, feedback provided to the user can be any form of sensory feedback (e.g., visual feedback, auditory feedback, or tactile feedback), and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

In some implementations, the computing devices depicted in FIG. 8 can include sensors that interface with, or are included in, a HMD 1490. For example, one or more sensors included on computing device 1450 or other computing device depicted in FIG. 8, can provide input to HMD 1490 or in general, provide input to that can be used by the HMD 1490. The sensors can include, but are not limited to, a touchscreen, accelerometers, gyroscopes, pressure sensors, biometric sensors, temperature sensors, humidity sensors, and ambient light sensors. Computing device 1450 (e.g., the HMD 1490) can use the sensors to determine an absolute position and/or a detected rotation of the HMD 1490 that can then be used as input for use by the HMD 1490.

In some implementations, one or more input devices included on, or connected to, the computing device 1450 and/or the HMD 1490 can be used as inputs for use by the HMD 1490. The input devices can include, but are not limited to, a touchscreen, a keyboard, one or more buttons, a trackpad, a touchpad, a pointing device, a mouse, a trackball, a joystick, a camera, a microphone, earphones or buds with input functionality, a gaming controller, or other connectable input device.

In some implementations, one or more output devices included on the computing device 1450, and/or in the HMD 1490, can provide output and/or feedback to a user of the HMD 1490. The output and feedback can be visual, tactical, or audio. The output and/or feedback can include, but is not limited to, rendering a display of the HMD 1490, vibrations, turning on and off or blinking and/or flashing of one or more lights or strobes, sounding an alarm, playing a chime, playing a song, and playing of an audio file. The output devices can include, but are not limited to, vibration motors, vibration coils, piezoelectric devices, electrostatic devices, light emitting diodes (LEDs), strobes, and speakers.

In some implementations, computing device 1450 can be placed within HMD 1490 to create an integrated HMD system. HMD 1490 can include one or more positioning elements that allow for the placement of computing device 1450, such as smart phone 1481, in the appropriate position within HMD 1490. In such implementations, the display of smart phone 1481 can render images using a display of the HMD 1490.

In some implementations, the computing device 1450 may appear as another object in a computer-generated, 3D environment. Interactions by the user with the computing device 1450 (e.g., rotating, shaking, touching a touchscreen, swiping a finger across a touch screen) can be interpreted as interactions with the object in the AR/VR space. As just one example, computing device can be a laser pointer. In such an example, computing device 1450 appears as a virtual laser pointer in the computer-generated, 3D environment. As the user manipulates computing device 1450, the user in the AR/VR space sees movement of the laser pointer. The user receives feedback from interactions with the computing device 1450 in the AR/VR environment on the computing device 1450 or on the HMD 1490.

In some implementations, a computing device 1450 may include a touchscreen. For example, a user can interact with the touchscreen in a particular manner that can mimic what happens on the touchscreen with what happens in a display of the HMD 1490. For example, a user may use a pinching-type motion to zoom content displayed on the touchscreen. This pinching-type motion on the touchscreen can cause information provided in display to be zoomed. In another example, the computing device may be rendered as a virtual book in a computer-generated, 3D environment.

In some implementations, one or more input devices in addition to the computing device (e.g., a mouse, a keyboard) can be rendered in a display of the HMD 1490. The rendered input devices (e.g., the rendered mouse, the rendered keyboard) can be used as rendered in the in the display.

A number of implementations have been described. Nevertheless, it will be understood that various modifications may be made without departing from the spirit and scope of the description and claims.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

Further to the descriptions above, a user is provided with controls allowing the user to make an election as to both if and when systems, programs, devices, networks, or features described herein may enable collection of user information (e.g., information about a user's social network, social actions, or activities, profession, a user's preferences, or a user's current location), and if the user is sent content or communications from a server. In addition, certain data may be treated in one or more ways before it is stored or used, so that user information is removed. For example, a user's identity may be treated so that no user information can be determined for the user, or a user's geographic location may be generalized where location information is obtained (such as to a city, ZIP code, or state level), so that a particular location of a user cannot be determined. Thus, the user may have control over what information is collected about the user, how that information is used, and what information is provided to the user.

The computer system (e.g., computing device) may be configured to wirelessly communicate with a network server over a network via a communication link established with the network server using any known wireless communications technologies and protocols including radio frequency (RF), microwave frequency (MWF), and/or infrared frequency (IRF) wireless communications technologies and protocols adapted for communication over the network.

In accordance with aspects of the disclosure, implementations of various techniques described herein may be implemented in digital electronic circuitry, or in computer hardware, firmware, software, or in combinations of them. Implementations may be implemented as a computer program product (e.g., a computer program tangibly embodied in an information carrier, a machine-readable storage device, a computer-readable medium, a tangible computer-readable medium), for processing by, or to control the operation of, data processing apparatus (e.g., a programmable processor, a computer, or multiple computers). In some implementations, a tangible computer-readable storage medium may be configured to store instructions that when executed cause a processor to perform a process. A computer program, such as the computer program(s) described above, may be written in any form of programming language, including compiled or interpreted languages, and may be deployed in any form, including as a standalone program or as a module, component, subroutine, or other unit suitable for use in a computing environment. A computer program may be deployed to be processed on one computer or on multiple computers at one site or distributed across multiple sites and interconnected by a communication network.

Specific structural and functional details disclosed herein are merely representative for purposes of describing example implementations. Example implementations, however, may be embodied in many alternate forms and should not be construed as limited to only the implementations set forth herein.

The terminology used herein is for the purpose of describing particular implementations only and is not intended to be limiting of the implementations. As used herein, the singular forms "a," "an," and "the" are intended to include the plural forms as well, unless the context clearly indicates otherwise. It will be further understood that the terms "comprises," "comprising," "includes," and/or "including," when used in this specification, specify the presence of the stated features, steps, operations, elements, and/or components, but do not preclude the presence or addition of one or more other features, steps, operations, elements, components, and/or groups thereof.

It will be understood that when an element is referred to as being "coupled," "connected," or "responsive" to, or "on," another element, it can be directly coupled, connected, or responsive to, or on, the other element, or intervening elements may also be present. In contrast, when an element is referred to as being "directly coupled," "directly connected," or "directly responsive" to, or "directly on," another element, there are no intervening elements present. As used herein the term "and/or" includes any and all combinations of one or more of the associated listed items.

Spatially relative terms, such as "beneath," "below," "lower," "above," "upper," and the like, may be used herein for ease of description to describe one element or feature in relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the term "below" can encompass both an orientation of above and below. The device may be otherwise oriented (rotated 130 degrees or at other orientations) and the spatially relative descriptors used herein may be interpreted accordingly.

Example implementations of the concepts are described herein with reference to cross-sectional illustrations that are schematic illustrations of idealized implementations (and intermediate structures) of example implementations. As such, variations from the shapes of the illustrations as a result, for example, of manufacturing techniques and/or tolerances, are to be expected. Thus, example implementations of the described concepts should not be construed as limited to the particular shapes of regions illustrated herein but are to include deviations in shapes that result, for example, from manufacturing. Accordingly, the regions illustrated in the figures are schematic in nature and their shapes are not intended to illustrate the actual shape of a region of a device and are not intended to limit the scope of example implementations.

It will be understood that although the terms "first," "second," etc. may be used herein to describe various elements, these elements should not be limited by these terms. These terms are only used to distinguish one element from another. Thus, a "first" element could be termed a "second" element without departing from the teachings of the present implementations.

Unless otherwise defined, the terms (including technical and scientific terms) used herein have the same meaning as commonly understood by one of ordinary skill in the art to which these concepts belong. It will be further understood that terms, such as those defined in commonly used dictionaries, should be interpreted as having a meaning that is consistent with their meaning in the context of the relevant art and/or the present specification and will not be interpreted in an idealized or overly formal sense unless expressly so defined herein.

While certain features of the described implementations have been illustrated as described herein, many modifications, substitutions, changes, and equivalents will now occur to those skilled in the art. It is, therefore, to be understood that the appended claims are intended to cover such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components, and/or features of the different implementations described.

What is claimed is:

1. A device comprising:
a display;
a sensor configured to perform eye-tracking to determine a gaze point on the display;
list display control circuitry configured to display a plurality of positions arranged around a central location on the display, the plurality of positions including at least one empty position and filled positions displaying a first subset of list elements, the filled positions including an adjacent position that is adjacent to the at least one empty position; and
list navigation control circuitry configured to
track movement of the gaze point relative to the filled positions and around the central location towards the at least one empty position,
fill the at least one empty position with a list element of the list elements, and
empty the adjacent position to thereby display a second subset of the list elements.

2. The device of claim 1, wherein the list element is a previously non-displayed list element of the list elements.

3. The device of claim 1, wherein the list display control circuitry is further configured to display an array with intersecting lines to define the plurality of positions and to define the central location at a point of intersection of the intersecting lines.

4. The device of claim 1, wherein the list display control circuitry is further configured to display a visually highlighted list element of the list elements when the gaze point is detected within a corresponding position of the plurality of positions.

5. The device of claim 1, wherein the list navigation control circuitry is further configured to:
detect a transition trigger based on the movement of the gaze point within at least one of the filled positions and relative to the at least one empty position; and
fill the at least one empty position and empty the adjacent position based on the transition trigger.

6. The device of claim 1, wherein the list elements include an ordered list, and wherein the list navigation control circuitry is further configured to fill the at least one empty position with the list element as a next consecutive list element of the ordered list.

7. The device of claim 1, wherein the list navigation control circuitry is further configured to navigate through the list elements in a forward direction when the movement of the gaze point is in a clockwise direction, and in a reverse direction when the movement of the gaze point is in a counterclockwise direction.

8. The device of claim 1, wherein the device is a head-mounted device (HMD).

9. The device of claim 1, further comprising a selection controller configured to receive a selection of the list element.

10. The device of claim 1, wherein the device includes smart glasses and the display includes a lens element of the smart glasses.

11. A computer program product, the computer program product being tangibly embodied on a non-transitory computer-readable storage medium and comprising instructions that, when executed by at least one computing device, are configured to cause the at least one computing device to:
display a plurality of positions arranged around a central location on a display, the plurality of positions including at least one empty position and filled positions displaying a first subset of list elements, the filled positions including an adjacent position that is adjacent to the at least one empty position;
track movement of a gaze point relative to the filled positions and around the central location towards the at least one empty position;
fill the at least one empty position with a list element of the list elements; and
empty the adjacent position to thereby display a second subset of the list elements.

12. The computer program product of claim 11, wherein the instructions, when executed by the at least one computing device, are further configured to cause the at least one computing device to:
display an array with intersecting lines to define the plurality of positions and to define the central location at a point of intersection of the intersecting lines.

13. The computer program product of claim 11, wherein the instructions, when executed by the at least one computing device, are further configured to cause the at least one computing device to:
display a visually highlighted list element of the list elements when the gaze point is detected within a corresponding position of the plurality of positions.

14. The computer program product of claim 11, wherein the instructions, when executed by the at least one computing device, are further configured to cause the at least one computing device to:
detect a transition trigger based on the movement of the gaze point within at least one of the filled positions and relative to the at least one empty position; and
fill the at least one empty position and empty the adjacent position based on the transition trigger.

15. The computer program product of claim 11, wherein the instructions, when executed by the at least one computing device, are further configured to cause the at least one computing device to:
fill the at least one empty position with the list element as a next consecutive list element of an ordered list.

16. The computer program product of claim 11, wherein the instructions, when executed by the at least one computing device, are further configured to cause the at least one computing device to:
navigate through the list elements in a forward direction when the movement of the gaze point is in a clockwise direction, and in a reverse direction when the movement of the gaze point is in a counterclockwise direction.

17. A method comprising:
displaying a plurality of positions arranged around a central location on a display, the plurality of positions including at least one empty position and filled positions displaying a first subset of list elements, the filled positions including an adjacent position that is adjacent to the at least one empty position;
tracking movement of a gaze point relative to the filled positions and around the central location towards the at least one empty position;
filling the at least one empty position with a list element of the list elements; and
emptying the adjacent position to thereby display a second subset of the list elements.

18. The method of claim 17, further comprising:
displaying a visually highlighted list element of the list elements when the gaze point is detected within a corresponding position of the plurality of positions.

19. The method of claim 17, further comprising:
detecting a transition trigger based on the movement of the gaze point within at least one of the filled positions and relative to the at least one empty position; and
filling the at least one empty position and empty the adjacent position based on the transition trigger.

20. The method of claim 17, further comprising:
navigating through the list elements in a forward direction when the movement of the gaze point is in a clockwise direction, and in a reverse direction when the movement of the gaze point is in a counterclockwise direction.

* * * * *